Patented Dec. 12, 1933

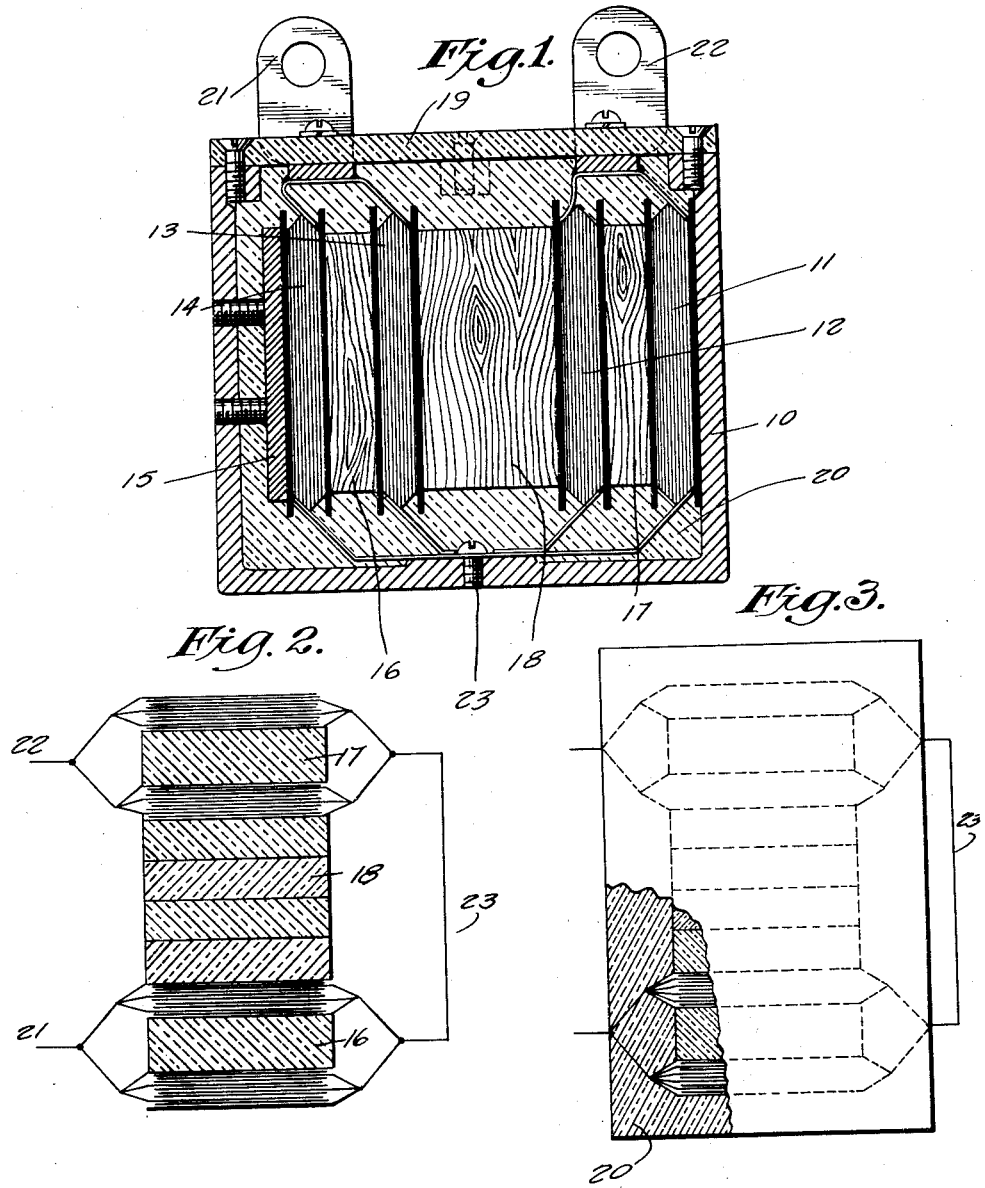

1,938,793

UNITED STATES PATENT OFFICE 1,938,793

SHORT WAVE CAPACITOR

William M. Bailey, Lynn, Mass., assignor, by mesne assignments, to General Electric Company, a corporation of New York Application August 21, 1930. Serial No. 476,820

4 Claims. (Cl. 175—41)

This invention relates to short wave capacitors of relatively high capacity and preferably also adapted for substantial current values.

Where a number of armatures are connected in parallel, for short wave working, that is, without any short series connections, the direction of current flow in each armature is the same and there are no oppositely flowing currents in different armatures to set up opposed magnetic fields the result being that eddy current losses in any metallic structure within the non-neutralized magnetic field become substantial and contribute to the heating of the capacitor.

To reduce such eddy current losses, the intensities of the non-neutralized magnetic fields from one set of armatures acting on another set are reduced in the present invention without reducing the capacity value of the condensers due to the parallel relations of the armatures this result being effected by providing the parallel connected armature foils with long leads into segregated groups held under high mechanical compression by spacing pressure blocks of insulating material. This prevents the magnetic fields of the several sections from being comparable in intensity to what they would be in the location of other sections if the groups were not separated by such insulating pressure blocks. Preferably the pressure blocks consist of an insulating material possessing low dielectric losses and more compressible and cheaper than bakelite and the like such as the wood of the maple tree.

Because with very high frequencies the current seems to be concentrated at the foil edges, it is desirable to have several spaced armature groups or sections connected in parallel thus affording a greater length for the edges along which the current concentrates and at the same time reducing the high frequency resistance of the foils, whereby the current-carrying ability of a condenser of predetermined capacity is increased.

Fig. 1 is a longitudinal section through one embodiment of this invention.

Fig. 2 shows the electrical connections for the sections, while Fig. 3 shows the embedment envelope surrounding the separated groups or sections.

The casing 10 enclosing the embedded groups is preferably an aluminum casting although other material may be used if desired. The numerals 11, 12, 13 and 14 designate groups or sections of micas and metal foils, all arranged in a single stack the foils of each group or section, and the groups or sections themselves, being all connected in parallel, as shown in Fig. 2 when all three terminals 21—23 are in circuit; but when terminals 21—22 only are in circuit, while the groups 11, 12, Fig. 1 being connected in parallel with one another and the groups 13, 14 in parallel with one another, yet groups 11, 12 being in series with groups 13, 14. When terminal 23 is in circuit with only 21 or 22 then groups 11, 12 above or groups 13, 14 above are in circuit and in parallel. An end plate 15 of aluminum, Fig. 1, transmits the clamping created by the screws shown to maintain the stack of groups or sections in the stack under high mechanical compression between opposite metallic walls of casing 10. Maple pressure blocks 16 and 17 separate each end pair of groups or sections from one another, while a much thicker pressure block 18 of the same material separates the successive pairs of groups or sections. Kiln dried maple is selected for these blocks because of the low dielectric losses within maple and because such wood is slightly compressible under the high mechanical compression which clamps the stack of segregated armature groups.

The blocks 16 and 17 are of substantially the same thickness as the sections 13 and 14 or the sections 11 and 12. The appropriate thickness for the blocks 16 and 17, as well as for the block 18 is all determined empirically by calculating the minimum separation for the sections which results in the tolerable or minimum intensities of magnetic fields of one armature group at the location of another group, and cause greatly the eddy current losses and heating. With the circuit connections of Fig. 2, the insulating block 18 is approximately three times as thick as any one block 16 or 17, i. e., it is of the same order of thickness as the combined thickness of groups 13, 14 and block 16. Since the direction of the instantaneous current in each of the foils is in the same direction, as above, the magnetic fields due to each section are in the same direction and do not neutralize, but by separating the armature groups by the insulating pressure blocks as above the strength of the portions of the fields which overlap is reduced with consequent lowering of eddy current losses and heating; the insulating blocks being outside the circuits and preserving the parallel connections of the armature foils by the long leads extending thru the spaces between the sides of the stack and the casing. The cover 19 is preferably of bakelite and is secured in position by the screws illustrated. On the cover are located the two terminals 21 and 22 while the opposite terminal 23 is grounded to the metallic portions of the casing.

The electrical connections will be more clearly understood from Fig. 2.

In Fig. 2 the central maple separator 18 is shown as being made up of a number of separate sections. Surrounding the spaced armature-groups is an embedment 20 of appropriate insulating material such as paraffin wax or sulphur which is readily fusible but solid at ordinary temperatures.

While the armature-group 11 in Fig. 1 is shown contiguous to a side of the casing, it may, if desired, be spaced from the casing just as is the group 14 on the opposite side, in which event all the groups of armatures are enclosed in an envelope of embedment 20 as shown.

The capacitor illustrated has been designed as a filament by-pass condenser having relatively large capacity of the sections or groups of about .06 microfarad adapted for a wave length of only 15 meters (25,000 kilocycles) at 200 volts and with a temperature rise of only about 15° C. as the upper limit. The high current-carrying ability of the leads shown in Fig. 1 connecting the armature-groups 11, etc., with the terminals 21, etc., provides for conduction of such heavy current without undue heating of the leads themselves; but such high capacities of the armature-groups is obtained by the provision of a number of armatures which as indicated in the drawing constitutes a comparatively large mass of metal in each group, and such heavy current applied to the terminals of the capacitor, sets up intense electromagnetic fields around each such group, so that, particularly at high frequency, such fields tend to cause high eddy current losses and harmful heating in any such mass of metal as these armature-groups which might lie in the denser portions of such intense electromagnetic fields around neighboring armature-groups. When the applied voltage is comparatively low as above, even though the frequency be high, electrostatic fields do not constitute any problem concerned with the masses of metal in the armature-groups of high capacity. It is the electromagnetic fields which have caused the heating difficulties under these conditions. According to the present invention, not only are the leads between armature-groups and terminals heavy enough to prevent undue heating by conduction of the high frequency currents of heavy amperage, but the tendency of such currents to cause eddy-current heating of the mass of metal in one armature group by the denser portions of intense electromagnetic fields around neighboring armature-groups, is reduced to the desired amount by the low-cost, light wooden spacers, so that even under such severe conditions of high frequency and large current, applied to the terminals of the high capacity condenser, the entire condenser including both special stack and high-current leads inside the casing, operates cool as desired, notwithstanding the comparatively large masses of metal in the high capacity armature-groups, for the reason that by means of such spacers the mass of metal in each armature group is removed to a point outside the denser portions of the electromagnetic fields around neighboring armature-groups, so that no undesirable amount of heat is generated by eddy currents in any armature group. Since, therefore, all undesirable heating is thus prevented from being generated in the first place, there is obviated all need of removal of such heat if generated; i. e., it is not necessary to expose the stack to air or other cooling medium or otherwise, or to provide any heat-conductors, metal or otherwise in the stack adjacent the armature-groups, for the purpose of conducting heat therefrom and dissipating it to a cooler medium; but on the other hand the invention permits the stack, of desired high capacity and adapted to withstand application of the above high frequency currents of high amperage, to be embedded in the casting 20 of wax or sulfur in casing 10 in the ordinary way, just as if the device were of much lower capacity or as if the applied high frequency current were of low amperage; altho of course, as in any such case, the heavy leads to the terminals as shown do provide for ready conduction of some heat from the armature groups to the terminals, the same being true in less degree of the wax or sulfur embedment 20, as to its conduction of a little heat from the armature-groups to the metallic casing 10. But in accordance with the invention, substantially no heat is conducted from the thermally and electrically insulating spacers of wood, which are embedded in and enclosed by the poorly heat-conducting embedment 20 and thereby substantially heat-insulated from the metallic casing 10 and the other two terminals 21, 22. On the other hand, the heavy leads connect the armature-groups directly to the heat-dissipating casing 10 and terminals 21, 22 and serve to conduct to and dissipate in the external atmosphere all heat generated in the leads themselves by the high frequency heavy current, it being unnecessary however to provide for conduction and dissipation of heat generated by the intense electromagnetic fields generated by the high frequency heavy applied current because all such heat can be prevented from being generated in the first place by the above arrangement of the wooden spacers designed with express relation to the high capacity and corresponding metallic masses of the armature-groups, and to the high amperage of the applied high frequency current.

The embodiment illustrated gives approximately from 25 to 50% better results from the standpoint of heating or current carrying ability, than would be possible if the insulating separating pressure blocks were not used, and the armature groups were not separated or if the sections were separated but the pressure blocks were of metal. The desired number of foils to each segregated armature group is determined empirically and few are better than many.

What is claimed is:

1. A capacitor comprising a stack of sections connected in parallel so that the fields due to the currents in the armatures are in the same direction; separator blocks of insulating material in the stack between successive sections, said sections being arranged in pairs along the stack with the blocks between sections of each pair thinner than the blocks between facing sections of the pairs; but the thinner blocks having substantial thickness substantially reducing heating inside the stack, the respective blocks insulating and reducing heating inside the stack, the respective blocks insulating successive sections from one another in the stack.

2. A capacitor comprising a stack of sections connected in parallel so that the fields due to the currents in the armatures are in the same direction, and a separator block of insulating material in the stack between sections, said sections being arranged in pairs with the blocks between the sections of each pair thinner than the blocks between the pairs, the thickness of the block between the pairs being at least about twice the thickness of the blocks between sections of a pair, all the blocks insulating successive sections from one another in the stack and having a thickness substantially reducing heating inside the stack.

3. A capacitor comprising a stack of armature foils in combination with long leads extending from the sides of the stack and connecting the foils in parallel with one another, and means subjecting the ends of the stack to high mechanical compression; the foils being segregated into groups in the stack and into groups of groups therein, each individual group including a comparatively small number of armatures; the armatures in each individual group being separated by dielectric sheets insulating successive armatures from one another and having the same order of thickness as the armatures themselves; the individual groups of armatures being separated by dielectric blocks insulating successive groups from one another, having the same order of thickness as the groups themselves and filling the spaces between the groups; and the groups of groups of armatures being separated by a thick dielectric block insulating successive groups of groups from one another, and having the same order of thickness as the combined thicknesses of the groups of armatures and the dielectric blocks between said groups, said thick dielectric block filling the space between the adjacent groups of the groups of groups in the stack.

4. A short-wave capacitor of large capacity, which includes a casing including metallic and insulating portions and an enclosed stack held under high mechanical compression by and between opposite metallic walls of the casing, the sides of the stack being spaced from the casing walls; long leads extending from the armatures in the stack connecting them in parallel and extending across the space between the stack and the casing; two terminals mounted on the insulating portion of the casing; said armatures and their intervening dielectric sheets being segregated in the stack into a plurality of groups each including a comparatively small number of armatures connected in parallel by said leads; and said groups themselves being segregated into groups also connected in parallel by said leads; insulating pressure blocks insulating successive armature groups from one another but filling the space between successive groups in each group of groups and having a thickness of the same order of thickness as the individual groups themselves; and an insulating block insulating the groups of groups from one another but filling the space between said groups of groups and having substantially greater thickness than the aforesaid blocks; said long leads respectively extending from the armatures of the respective individual armature groups, and a set of said leads of one polarity being connected to a metallic portion of the casing.

WILLIAM M. BAILEY.